US012771289B2

(12) United States Patent
Barrovecchio

(10) Patent No.: US 12,771,289 B2
(45) Date of Patent: Oct. 20, 2026

(54) DEFORMABLE VERTICAL PHOTOVOLTAIC SYSTEM AND METHOD FOR INSTALLING SUCH A SYSTEM

(71) Applicant: ENGIE, Courbevoie (FR)

(72) Inventor: Luc Barrovecchio, Courbevoie (FR)

( * ) Notice: Subject to any disclaimer, the term of this patent is extended or adjusted under 35 U.S.C. 154(b) by 0 days.

(21) Appl. No.: 18/859,777

(22) PCT Filed: Mar. 28, 2023

(86) PCT No.: PCT/EP2023/058047

§ 371 (c)(1),
(2) Date: Oct. 24, 2024

(87) PCT Pub. No.: WO2023/208499

PCT Pub. Date: Nov. 2, 2023

(65) Prior Publication Data

US 2025/0286505 A1 Sep. 11, 2025

(30) Foreign Application Priority Data

Apr. 25, 2022 (FR) .................................. FR2203826

(51) Int. Cl.
*H02S 30/20* (2014.01)
*H02S 20/10* (2014.01)

(52) U.S. Cl.
CPC .............. *H02S 30/20* (2014.12); *H02S 20/10* (2014.12)

(58) Field of Classification Search
None
See application file for complete search history.

(56) References Cited

U.S. PATENT DOCUMENTS

2011/0048845 A1 3/2011 Park
2017/0207744 A1* 7/2017 Densham ................ F24S 23/77
2020/0153380 A1 5/2020 Hildebrandt et al.

FOREIGN PATENT DOCUMENTS

CN 201608189 U 10/2010
CN 102251738 B 5/2014
(Continued)

OTHER PUBLICATIONS

Drei integrierte PV-schallschutz Versuchsfelder; Bau und Erprobung; Schlussbericht PV BFE P+D, DIS 17225/ 59391, Dec. 2002 ewz-Stromsparfonds Vertrag Nr. S 97.011.

(Continued)

*Primary Examiner* — Daniel P Malley, Jr.
(74) *Attorney, Agent, or Firm* — PatShegen IP; Moshe Pinchas

(57) ABSTRACT

The invention relates to a deformable vertical photovoltaic system (100) comprising at least one photovoltaic cell (105) and a post (110) having an axis (A), which deformable vertical photovoltaic system also comprises at least:

- a first attachment means (115), referred to as the "lower attachment means", for attaching a lower portion of a module to a post; and
- a second attachment means (120), referred to as the "upper attachment means", for attaching an upper portion of a module to a post, each means being at least free to move in translation along the axis of the post and/or at least free to rotate on an axis (B, C) perpendicular to the axis of the post, at least one attachment means from between the lower attachment means and the upper attachment means being at least free to move in translation along the axis of the post and the other attachment means being at least free to rotate on the axis perpendicular to the axis of the post.

12 Claims, 10 Drawing Sheets

(56) References Cited

FOREIGN PATENT DOCUMENTS

| | | | |
|---|---|---|---|
| CN | 203603078 | U | 5/2014 |
| CN | 204780649 | U | 11/2015 |
| CN | 204780664 | U | 11/2015 |
| CN | 205501862 | U | 8/2016 |
| CN | 106869042 | A | 6/2017 |
| CN | 206418429 | U | 8/2017 |
| CN | 206680891 | U | 11/2017 |
| CN | 206682825 | U | 11/2017 |
| CN | 206707078 | U | 12/2017 |
| CN | 105386415 | B | 2/2018 |
| CN | 108239948 | A | 7/2018 |
| CN | 108824244 | A | 11/2018 |
| CN | 109680621 | A | 4/2019 |
| CN | 111537026 | A | 8/2020 |
| CN | 112177432 | A | 1/2021 |
| JP | 2019103378 | A | 6/2019 |
| KR | 10-1447103 | B1 | 9/2014 |
| KR | 2016-0111698 | A | 9/2016 |
| KR | 10-1895923 | B1 | 9/2018 |
| KR | 2018-0115951 | A | 10/2018 |
| KR | 10-1919956 | B1 | 11/2018 |
| KR | 10-2095901 | B1 | 3/2020 |
| KR | 10-2115560 | B1 | 5/2020 |
| KR | 10-2126011 | B1 | 6/2020 |
| KR | 10-2138744 | B1 | 7/2020 |
| WO | 2022168355 | A1 | 8/2022 |

OTHER PUBLICATIONS

Improving the Performance of Bifacial Module Technology in a Grid-Connected PV Noise Barrier System Thomas Nordmann, Luzi Clavadetscher, TNC Consulting AG, 21st European Photovoltaic Solar Energy Conference, Sep. 4-8, 2006, Dresden, Germany.

5.2 PV and Architecture 15 Years of Practical Experience in Development and Improvement of Bifacial Photovoltaic Noise Barriers Along Highways and Railway Lines in Switzerland Th. Nordmann • Th. Vontobel • L. Clavadetscher 27th European Photovoltaic Solar Energy Conference and Exhibition.

The Need of Frameless Mounting Structures for Vertical Mounting of Bifacial PV Modules; Jorge Rabanal-Arabach et al. 32nd European Photovoltaic Solar Energy Conference and Exhibition.

Luminescent Solar Noise Barrier—Large Scale Testing and Modeling; Lenneke Slooff-Hoek, et al, ;Jun. 22, 2016.

Vertical bifacial solar farms: Physics, design, and global optimization M. Ryyan Khan et al, Applied Energy 206 (2017) 240-248.

Reference Design for a Highway Noise Barrier With Integrated Bifacial PV, Josco Kester, et al, Sep. 28, 2017.

Performance Analysis of Vertically Mounted Bifacial PV Modules on Green Roof System, T. Baumann, et al.

Floatovoltaics with bifacial PV, Anna Carr, et al.

Building the World's Largest Bifacial Solar Noise Barrier; M.M. de Jong, et al; 35th European Photovoltaic Solar Energy Conference and Exhibition.

Price-Bifaciality Relationship of Bifacial Modules in Vertical East-West Oriented PV Systems; L. Bodlak, 35th European Photovoltaic Solar Energy Conference and Exhibition 2134.

Bigeye, simulation under shadow conditions, Dr. A.R. Burgers.

Energy yield analysis of bifacial PV modules: different technologies and configurations; Ana Gracia-Amillo; European Commission, Joint Research Centre (JRC), Ispra, Italy.

Le bifacial linéaire et vertical; Hervé Colin,Astrig Benefice et Héléna Wagret.

Modeling Tool Validation for the Yield Prediction of Bifacial East West Vertical PV System in Nordic Conditions; Samuli Ranta et al.

Optimizing wind barrier and photovoltaic array configuration in soiling mitigation; Kudzanayi Chiteka et al, Renewable Energy 163 (2021) 225e236.

International Search Report; Jun. 12, 2023.

* cited by examiner

DEFORMABLE VERTICAL PHOTOVOLTAIC SYSTEM AND METHOD FOR INSTALLING SUCH A SYSTEM

TECHNICAL FIELD OF THE INVENTION

The present invention relates to a deformable vertical photovoltaic system and a method for installing such a system. It applies, in particular, to the field of the production of energy from renewable sources.

STATE OF THE ART

In the field of the production of energy from renewable sources, the use of photovoltaic systems is an effective solution for transforming light energy into electrical energy. However, the installation of such systems must take certain constraints inherent in the installation site into account. These constraints can be mechanical and occur during the operation of photovoltaic systems. For example, exposure to the wind exerts significant dynamical mechanical stresses applied to the photovoltaic system. Ultimately, these mechanical stresses result, for example, in:

- the formation of micro-cracks, frequently followed by an irreversible deterioration of the photovoltaic cells, which can occur with no change to the front and back protective covers of the module; and/or
- a mechanical deterioration of the front and back protective glass of the modules. This degradation of the modules results in a reduction in the electricity production. In particular, when this degradation occurs on one module, the reduction in the electricity production occurs on all the other modules serially connected to the degraded module. In addition, this degradation also results in the creation of "hot points" in the broken cells of the modules. These hot points accelerate the degradation of the module by damaging, in particular, an outer protective layer of the module. Damage to the outer protective layer of the module results, for example, in a current leakage and there a significant risk to the safety of the installation. In these cases, the local or total shutdown of the installation is necessary in order to change the degraded module. Thus, a premature ageing of the photovoltaic system occurs when such a system is subjected to dynamic mechanical stresses.

The solutions of the prior art describe the addition additional material to the photovoltaic system so as to strengthen and stiffen the supporting structure.

However, such solutions results in an increase in the production costs of the supporting structure, and also negative environmental impacts. Thus, the environmental impact of the life cycle of such structure is significantly affected. In addition, such an addition of material can result in more shadows on the photovoltaic modules, and therefore have a negative impact on the electricity production.

Presentation of the Invention

The present invention aims to remedy all or part of these drawbacks.

To this end, according to a first aspect, the present invention envisages a deformable vertical photovoltaic system comprising at least:

- a photovoltaic module having a front face, referred to as the "principal surface" of the module, parallel to the plane formed by the active parts of the photovoltaic cells; and

- a post having an axis (A), which deformable vertical photovoltaic system also comprises at least:

- a first attachment means, referred to as the "lower attachment means", for attaching a lower portion of a module to a post; and
- a second attachment means, referred to as the "upper attachment means", for attaching an upper portion of said module to said post,
- each attachment means being deformable and/or at least free to move in translation along the axis of the post and/or at least free to rotate on an axis perpendicular to the axis of the post and parallel to the principal surface of the module,
- at least one attachment means from amongst the lower attachment means and the upper attachment means being deformable and/or at least free to move in translation along the axis of the post, and the other attachment means being deformable and/or at least free to rotate on the axis perpendicular to the axis of the post and parallel to the principal surface of the module.

Thanks to these provisions, the system enables a significant limitation of the dynamic mechanical stresses, for example, exerted on the module when the system is exposed to strong winds. When the module and/or the post are deformed under the action of dynamic mechanical stresses, the stresses at the location of the attachment means are minimised. In this way, the mechanical durability of the module is increased.

The mechanical deformation of the supporting structure of the system and the possibilities for movement of the attachment systems make it possible to limit the amount of material in this structure. The production of such a structure therefore requires a smaller amount of material enabling, for example, a reduction in the costs and environmental impacts inherent in the production. In addition, limiting the amount of material in the supporting structure of the system also allows the cross-section of elements of the system to be reduced. Therefore, the electricity production of the system is increased since the shadows formed by the structure and projected onto the photovoltaic module are minimised.

In addition, such a photovoltaic system can be installed easily, rapidly and possibly carried out on a large number of installation grounds comprising, for example, slopes or used for agriculture. The attachment means are compatible with a considerable variety of photovoltaic modules, such as modules having a large size, a non-standard organisation of the strings of photovoltaic cells, modules with or without frames.

Lastly, replacing a module, for example a damaged one, is facilitated without utilising complex means. In addition, the photovoltaic system can be disassembled easily and quickly. Therefore, the installation ground is not negatively impacted by an installation followed by removal when the operation of the photovoltaic system ceases.

In some optional embodiments, each attachment means is at least free to move in translation along the axis of the post and/or at least free to rotate on the axis perpendicular to the axis of the post and parallel to the principal surface of the module, at least one attachment means from amongst the lower attachment means and the upper attachment means being at least free to move in translation along the axis of the post and the other attachment means being at least free to rotate on the axis perpendicular to the axis of the post and parallel to the principal surface of the module. In some optional embodiments, one of the attachment means from amongst the lower attachment means and the upper attachment means is at least free to rotate on the axis perpendicular to the axis of the post and the other attachment means is at least free to move in translation along the axis of the post and at least free to rotate on the axis perpendicular to the axis of the post and parallel to the principal surface of the module.

Thanks to these provisions, when the photovoltaic system is subjected to dynamic mechanical stresses, the means for attaching to the post will rotate on two parallel axes. The significant mechanical tensions in the attachment area are therefore limited because the pinching effects are reduced. The cells of the photovoltaic module that are close to the attachment area are therefore preserved.

In some optional embodiments, one of the elements from amongst a rotationally free attachment means and the post comprises a hole and the other a shaft, the hole and the shaft forming a pivot link or a sliding pivot.

Thanks to these provisions, the system makes it possible for the module to rotate at the location of the pivot link or sliding pivot when dynamic stresses are applied.

In some optional embodiments, one of the elements from amongst a translationally free attachment means and the post comprises a slide channel and the other a slide, the slide channel and the slide forming a sliding link or a sliding pivot.

Thanks to these provisions, when dynamic stresses are applied, the system makes it possible for the module to move in translation along the post.

In some optional embodiments, the attachment means that is free to move in translation comprises an intermediate assembly means, this intermediate assembly means being configured to form a slide channel around at least one part of the post.

Thanks to these provisions, the intermediate assembly means makes it possible to increase the surface of contact between the post and the attachment means. This strengthens the securing of the module on the post while retaining the translational freedom of the attachment means.

In some optional embodiments, the attachment means free to move in translation and comprising an intermediate assembly means is free to rotate, and also comprises an intermediate rotational means forming a pivot link or sliding pivot with the intermediate assembly means.

Thanks to these provisions, the assembly formed of the intermediate assembly means and the intermediate rotational means enables the rotational freedom of the attachment means.

In some optional embodiments, the photovoltaic module is rectangular, the module being oriented such that a short side of the module is arranged facing a surface on which the photovoltaic system is installed.

Thanks to these provisions, the photovoltaic module present in the photovoltaic system is secured by at least one of its long sides. In this way resistance to mechanical stresses is improved compared to a system in which a module is secured by one of its short sides. In particular, additional support is provided to the module by securing a long side of the module to the post, enabling its layout in a configuration referred to as "portrait". A more stable and vertical fixed bifacial photovoltaic system is therefore installed in the ground. The system also makes it possible to reduce the footprint, and in particular to increase compatibility with agricultural activity on the installation land.

In addition, this system is therefore compatible with, for example, agrivoltaism. Such an installed system also has a low hydrological impact on the plants when it is installed on agricultural land. Therefore, coactivity is established, corresponding to the coexistence between a major agricultural activity and an efficient production of energy by one or more photovoltaic systems. This coactivity is referred to as "agrivoltaism", also known as "Agri-PV" or "APV".

In some optional embodiments, the photovoltaic system also comprises:

- at least one cross member arranged under the module positioned facing a surface on which the photovoltaic system is installed, and having extremities; and
- at least two fastenings, each such fastening being configured to secure an individual extremity of at least one such cross-member to a post, this cross-member being arranged and secured between at least two posts.

Thanks to these provisions, the cross-member makes it possible to improve the system's stability and mechanical resistance. Additionally, the cross-member makes it possible in particular, when it is arranged below and in contact with a module, to reinforce the vertical and height maintenance of the module subjected to gravity. Lastly, the cross-member, for example, can enable the routing and protection of the electric cables of the photovoltaic system.

According to a second aspect, the present invention envisages a method for installing a deformable vertical photovoltaic system comprising:

- a step of securing an extremity of at least one post to the ground, each post having an axis;
- a step of securing a removable cross-member to at least one post;
- a step of positioning at least one photovoltaic module resting on the cross-member, each photovoltaic module having a front face, referred to as the "principal surface" of the module, parallel to the plane formed by the active parts of the photovoltaic cells;
- a step of securing a lower part of said module to said at least one post by a lower attachment means that is deformable and/or at least free to move in translation along the axis of the post and/or at least free to rotate on an axis perpendicular to the axis of the post and parallel to the principal surface of the module;
- a step of securing an upper part of at least one module to said at least one post by an upper attachment means that is deformable and/or at least free to move in translation along the axis of the post and/or at least free to rotate on an axis perpendicular to the axis of the post and parallel to the principal surface of the module, at least one attachment means from amongst the lower attachment means and the upper attachment means being deformable and/or at least free to move in translation along the axis of the post, and the other means being deformable and/or at least free to rotate on an axis perpendicular to the axis of the post; and
- a step of removing the removable cross-member.

As the particular aims, advantages and features of the method that is the subject of the present invention are similar to those of the device that is the subject of the present invention, they are not repeated here.

BRIEF DESCRIPTION OF THE FIGURES

Other advantages, aims and particular features of the invention will become apparent from the non-limiting description that follows of at least one particular embodiment of the device and method that are the subjects of the present invention, with reference to drawings included in an appendix, wherein.

DESCRIPTION OF THE EMBODIMENTS

Figure 1:
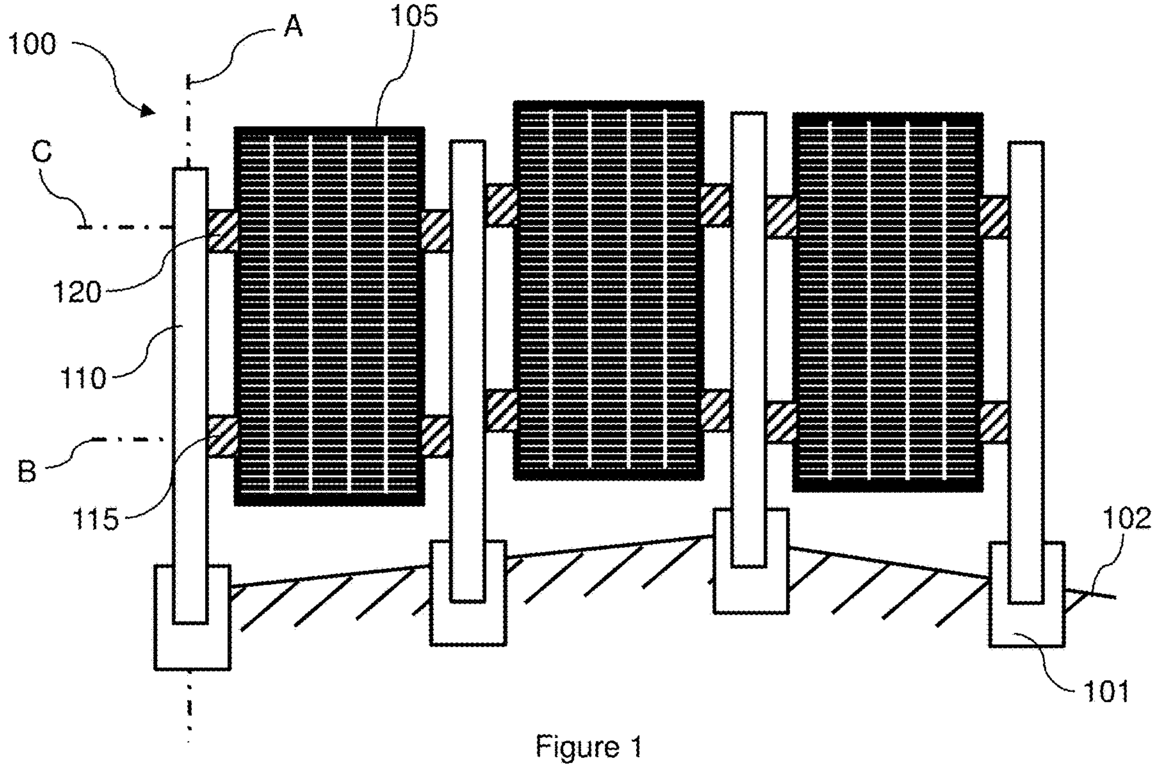
FIG. 1 represents, schematically, in a front view, a first particular embodiment of the photovoltaic system that is the subject of this invention.

The present description is given in a non-limiting way, in which each characteristic of an embodiment can be combined with any other characteristic of any other embodiment in an advantageous way.

Throughout the description, the term "upper" or "top" refers to being located at the top in FIGS. 1 to 6, which corresponds to the normal use configuration of the system, and "bottom" or "lower" to being located at the bottom in these FIGS. 1 to 6. The term "back" refers to being located to the rear of the plane of the FIGS. 1 to 4, and "front" to being located at the front of the plane of the FIGS. 1 to 4. The terms "vertical" and "horizontal" flow from these definitions. The term "left" refers to being located on the left in FIGS. 5, 6, 10, 13, 15, 20. The term "right" refers to being located on the right in FIGS. 5, 6, 10, 13, 15, 20. The systems shown in FIGS. 1 to 6 each have an axis A corresponding to an axis of a post when the photovoltaic system is not submitted to dynamic mechanical stresses. When the system is subjected to dynamic mechanical stresses, as shown on the right of FIGS. 5 and 6, the axis A of a post is a tangent to the curve formed by a post deformed under the effect of stresses. The systems shown in FIGS. 1 to 6 also have an axis B parallel to the "principal surface" of the module and perpendicular to the axis A of a post.

The following definitions are noted here:

The term "deformable" refers to an elastic deformation of a part or a whole comprising an elastic material, i.e. a material able to undergo deformation when forces are applied, and return to its initial condition with no alterations when these forces are no longer applied. In other words, an elastically deformable material is able to undergo an elastic deformation, unlike a plastically deformable material.

The term "increased electricity production" refers to an increase in the production of electricity, for example due to a larger amount of solar energy reaching the photovoltaic cells of the module.

The term "bifacial module" refers to a module producing electricity on both of its faces. The faces of a module are the two surfaces having the largest dimension. A bifacial module allows the light on its front face and its back face to be transmitted to its photovoltaic cells. The photovoltaic cells use the light on both of their faces to produce electricity. In general, there is a junction box on the back face of the module, and the power generated by the back face is usually less than the power generated by the front face.

The term "facing the ground" refers to an installation configuration in which one short side of the photovoltaic module is closer to the ground than the other short side of the photovoltaic module when the photovoltaic module is rectangular.

The term "C-shaped", used to define the shape of a cross-member, refers to a general shape having:

- a support side, which supports an element and is substantially horizontal;
- a side opposite the support side, which does not support an element and is substantially horizontal;
- the support side and the opposite side being connected by two sides, these two sides corresponding to a front side and a back side, the front side or the back side being at least partially free of material.

The term "U-shaped", used to define the shape of a cross-member, refers to a general shape having:

- a support side, which supports an element and is substantially horizontal;
- a side opposite the support side, which does not support an element and is substantially horizontal and partially free of material;
- the support side and the opposite side being connected by two sides, these two sides corresponding to a front side and a back side.

The term "installation surface" refers to a surface on which a photovoltaic system is installed. For example, such a surface refers to an installation ground. For example, the installation ground of the photovoltaic system is agricultural land.

The term "dynamic mechanical stresses" refers to stresses exerted on an installed photovoltaic system. In particular, these stresses are dependent on the characteristics of the installation site of the photovoltaic system. For example, such stresses are exerted by the wind applied on the surface of a photovoltaic module. Under the effect of the wind, the module follows, for example, a translational movement, and thus exerts a force on the post. A reversible deformation of the post is therefore observed, as shown on the right of FIGS. 5 and 6. Note that the deformation of the post under the effect of the wind is not linear, in other words, the longitudinal profile of the post deformed under the effect of the wind follows a curve.

It is now noted that the figures are not to scale.

FIG. 1, which is not to scale, shows a schematic view of an embodiment of the photovoltaic system 100 that is the subject of the present invention. The photovoltaic system 100 is substantially vertical with respect to the installation ground 102, and deformable.

It can be seen that the photovoltaic system 100 comprises at least one photovoltaic module 105 and at least one post 110 having an axis A. Preferably, the photovoltaic system comprises at least two posts 110. It can be seen that the photovoltaic module 105 of the system 100 has a front face, referred to as the "principal surface" of the module 105, parallel to the plane formed by the active parts of the photovoltaic cells. In particular, the plane is limited by the outer edges of the frames, or by the front and back layers protecting the modules when the module has no frame. The front and back layers can be made of glass in the case of double-glass modules, it is noted that other materials can also be used. The so-called "front" face of the photovoltaic module 105, corresponds to a surface having the largest dimension, referred to as "maximum". The face opposite the front face is referred to as a "back" face, and generally has the same surface as the front face. For example, when the photovoltaic module 105 is a parallelepiped, the maximum surface corresponds to the face delimited by the two edges (width, length or height) of the module having the largest values.

FIG. 1 shows that the photovoltaic system 100 comprises:

a first attachment means 115, referred to as the "lower attachment means", for attaching a lower portion of a module 105 to a post 110; and a second attachment means 120, referred to as the "upper attachment means", for attaching an upper portion of a module 105 to a post 110.

In some embodiments, such as the one shown in FIG. 1, the principal surface, or front face, of a photovoltaic module 105 has the form of a parallelepiped.

In some embodiments (not shown), at least two photovoltaic modules 105 are arranged vertically, one photovoltaic module 105 being arranged above the other photovoltaic module 105 when the photovoltaic system 100 is installed.

In some embodiments, the photovoltaic module 105 is framed. In some variants, the photovoltaic module 105 is frameless. In other words, the securing edge of the module 105 has no securing frame. For example, the photovoltaic module 105 is a double-glass module with no frame, also known as a "photovoltaic laminate" in the photovoltaic industry.

Note that a post 110 of the photovoltaic system 100 has an axis A, and this axis is parallel to a largest dimension of the post 110 when the system 100 is not subject to any deformation. For example, when the post 110 is a tapered cylinder, the axis A is parallel to a generatrix of the tapered cylinder. For example, when the post 110 is polyhedral, the axis A is parallel to an edge having a largest dimension.

In some embodiments, such as the one shown in FIG. 1, the posts 110 are substantially vertical relative to the installation ground 102. In some variants (not shown), the posts 110 are inclined relative to the installation ground 102 and parallel to each other. In other words, the posts 110 are not orthogonal relative to the general plane formed by the installation ground 102. In this variant, it is noted that the inclination is not linked to the deformation of the photovoltaic system 100 subjected to dynamic mechanical stresses. For example, all the posts are vertical relative to the horizon, but not relative to the ground.

In some embodiments, such as the one shown in FIG. 1, the lower extremity of a post 110 comprises a block 101. The block 101 is partially or fully anchored in the ground 102 and thus strengthens the adhesion of the post 110 to the ground 102. Note that the adhesion and stabilisation of the post 110 on the ground 102 are achieved by any means known to the person skilled in the art. For example, the lower extremity of a post 110 is secured to the block 101 by a set of bolts.

Figure 7:
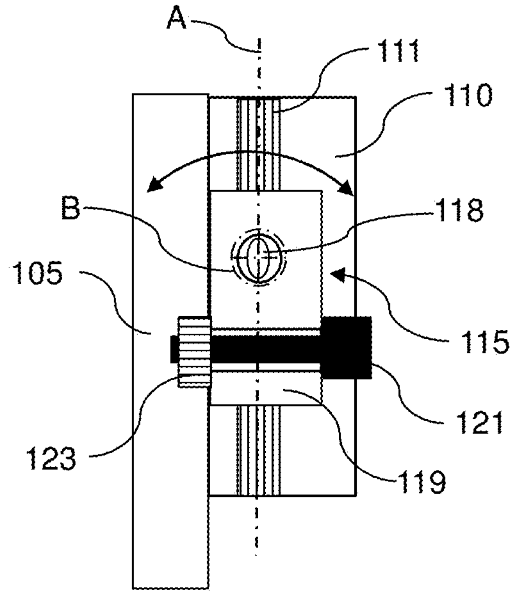
FIG. 7 represents, schematically, in a side view and in cross-section, a first particular embodiment of a lower attachment means.
Figure 8:
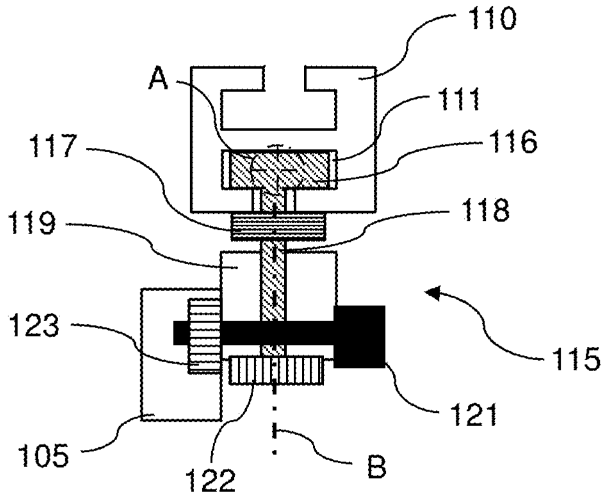
FIG. 8, represents, schematically, in a top view and in cross-section, the lower attachment means represented in FIG. 7.

In some embodiments, such as the one shown in FIG. 1, the lower attachment means 115 is free to rotate on an axis B perpendicular to the axis A of the post 110 and parallel to the principal surface of the module 105. In these embodiments, the upper attachment means 120 is free to move in translation along the axis A of the post 110. Preferably, the upper attachment means 120 is also free to rotate on an axis C. FIGS. 7 and 8 show an embodiment of a lower attachment means 115 that is free to rotate. The rotational freedom of the lower attachment means 115 is indicated, in FIG. 7, by a semicircular double-headed arrow.

Figure 11:
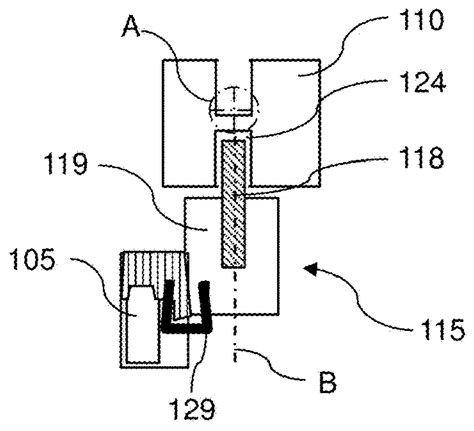
FIG. 11, represents, schematically, in a top view and in cross-section, a fourth variant of the lower attachment means represented in FIG. 9.

In some embodiments, such as the one shown in FIGS. 7 and 8, the photovoltaic module 105 is secured to the lower attachment means 115 by a bolt comprising a screw 121 and a nut 123. In some variants, the lower attachment means 115 is rigidly attached to the module 105 by at least one clip system 129 as shown in FIG. 11, a spring and/or a clamp.

In some embodiments, such as the one shown in FIGS. 7 and 8, the element 119 of the lower attachment means 115 is parallelepipedal. The element 119 is in contact with the lower portion of the module 105. In particular, the element 119 is in contact with a back surface, or back face, of the module 105. Note that the element 119 comprises a hole into which a shaft 118 is inserted. The axis of the shaft 118 is the axis B and is perpendicular to the axis A of the post 110. Preferably, the shaft 118 is held in the hole of the element 119 by a nut 122, as can be seen in FIG. 8. Note that the hole of the element 119 and the shaft 118 form a pivot link. In particular, this pivot link follows a movement that is similar to a pendulum movement as shown by the double-headed arrow in FIG. 7. In some variants, the hole of the element 119 and the shaft 118 form a sliding pivot link.

Figure 9:
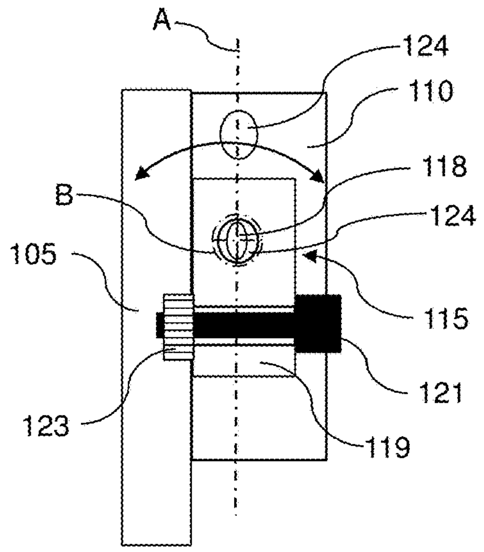
FIG. 9 represents, schematically, in a side view and in cross-section, a second particular embodiment of a lower attachment means.
Figure 10:
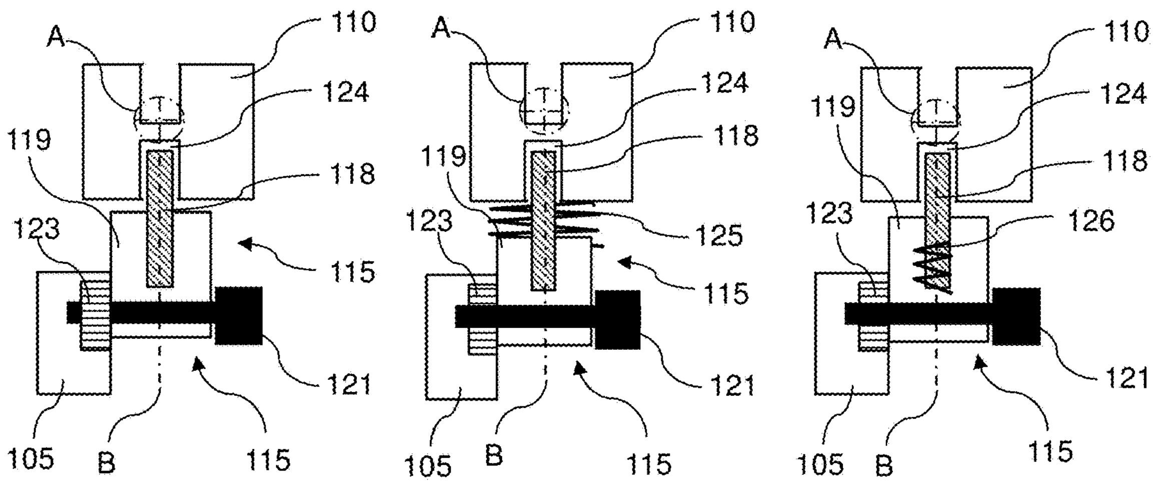
FIG. 10 represents, schematically, in a top view and in cross-section, three variants of the lower attachment means represented in FIG. 9.

FIG. 8 shows that the lower attachment means 115 comprises a slide 116. Preferably, the part 116 is a tapered cylinder. Note that the post 110 comprises a slot 111 forming a slide channel. In these embodiments, during the preliminary rigid attachment of the photovoltaic module 105 to the post 110, the slide 116 and the slot 111 form a sliding link. In particular, the module 105 is preliminarily attached to the post 110 by a translational movement along the axis A of the post 110. When the module 105 is preliminarily attached and positioned at a predefined height, the slide 116 is held in place in the slide channel 111 by a nut 117. The nut 117 is in fixed contact with a surface of the post 110. The use of the nut 117 corresponds to a complete rigid attachment of the lower portion of the module 105 to the post 110. In other words, the nut 117 eliminates the translational freedom of the lower attachment means 115 by securing the slide 116 and shaft 118 assembly at a predefined height of the post 110. In some variants, such as the one shown in FIG. 3, the lower attachment means 115 comprises a stud 118 inserted into a hole of the post 110. In these variants, as shown in FIGS. 9 to 11, the post 110 comprises a hole 124 and the rotationally free lower attachment means 115 comprises a shaft 118. Note that the hole 124 and the shaft 118 form a pivot link. In some variants, the hole 124 and the shaft 118 form a sliding pivot link. Note that the stud 118 and the shaft form a single element.

It can be seen, on the left of FIG. 10, that the stud 118 of the lower attachment means 115 has an axis B of rotation. Preferably, the stud 118 has a cylindrical shape, such as the one shown on the right of FIG. 15.

In some variants, such as the one shown in the centre of FIG. 10, the lower attachment means 115 comprises a spring 125. The spring 125 is arranged between an element 119 and the surface of the post 110 facing the lower attachment means 115. The spring is therefore in contact with two surfaces. Note that the spring 125 is configured to push the two surfaces in opposite directions. In particular, the spring 125 pushes elements in contact with the post 110 against the post 110. The spring 125 also pushes elements in contact with the element 119 against the element 119.

Therefore, the vibrations linked to a spacing, also called "play", between different elements are limited. In some variants, the stud 118 has a shoulder in contact with a mobile washer secured to an extremity of the spring 125. In this variant, the other extremity is secured to the element 119. The shoulder ensures that the mobile washer is held, and thus prevents the spring from falling when the module 105 is secured to the post 110.

In some variants, such as the one shown on the right of FIG. 10, the stud 118 can be retracted in the element 119 of the lower attachment element 115 by means of a spring 126. In other words, the spring 126 holds the stud 118 in the hole 124 of the post 110. The retractability of the stud 118 ensures that the module 105 can be secured rapidly to the post 110, thereby facilitating the installation of the system 100.

Figure 12:
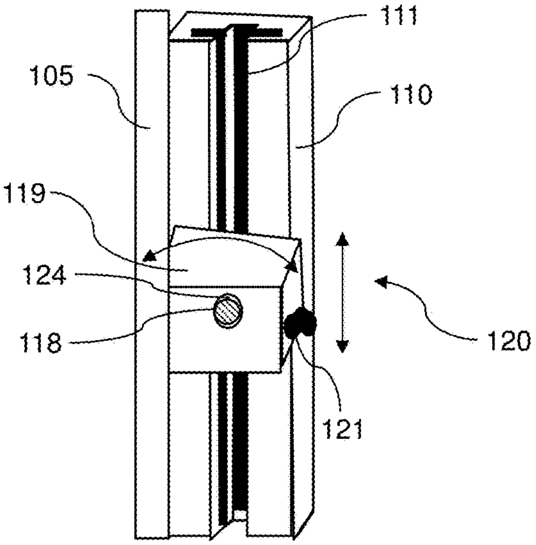
FIG. 12 represents, schematically and in perspective, a first particular embodiment of an upper attachment means.

FIG. 12 shows an embodiment of an upper attachment means 120 that is free to move in translation along the axis A of the post 110. The translational freedom of the upper attachment means 120 is indicated, in FIGS. 12 and 14, by a vertical straight double-headed arrow. The upper attachment means 120 is also free to rotate on an axis C perpendicular to the axis A of the post 110 and parallel to the principal surface of the module 105. The rotational freedom of the upper attachment means 120 is indicated, in FIG. 12, by a semicircular double-headed arrow.

Figure 13:
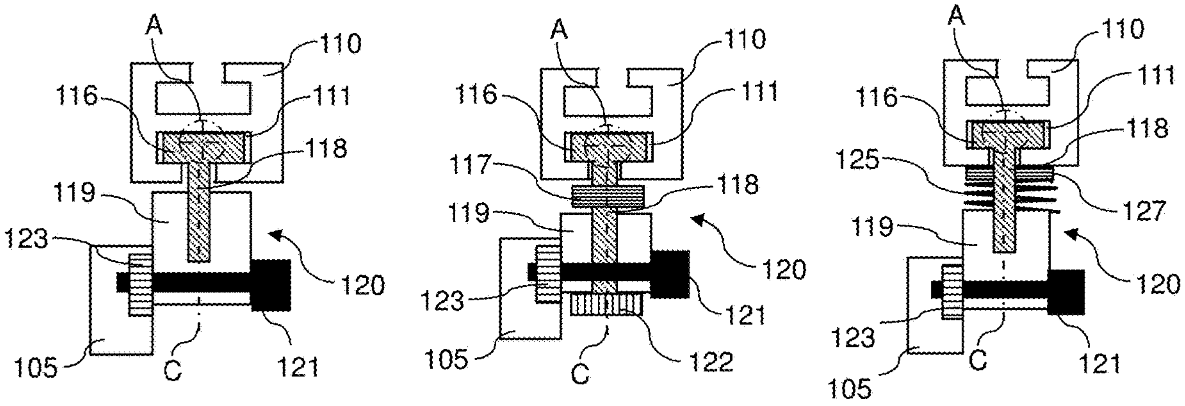
FIG. 13 represents, schematically, in a top view and in cross-section, three variants of the upper attachment means represented in FIG. 12.

Note that the above description of elements in FIG. 10 also applies to similarly numbered elements shown in FIG. 13, unless otherwise indicated.

Figure 15:
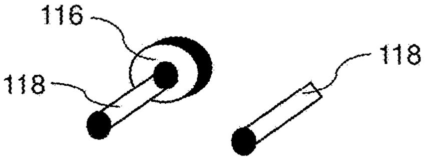
FIG. 15 represents, schematically and in perspective, particular embodiments of elements comprised in the upper and lower attachment means represented in FIGS. 9 to 14.

FIG. 13 shows that the upper attachment means 120 comprises a slide 116. Preferably, the part 116 is a tapered cylinder, as shown in FIG. 15. When the slide 116 is a tapered cylinder, the friction present during the sliding of the slide 116 in the slide channel 111 is limited. Note that the post 110 comprises a slot 111 forming a slide channel. In these embodiments, the slide 116 of the upper attachment means 120 and the slide channel 111 of the post 110 form a sliding link. In some variants, the slide 116 of the upper attachment means 120 and the slide channel 111 of the post 110 form a sliding pivot link. Note that the degree of translational freedom of the attachment means 120 is maintained.

It can be seen, on the left of FIG. 13, that no element is arranged between an element 119 of the upper attachment means 120 and the surface of the post 110 facing the lower attachment means 120. In some variants, such as the one shown in the centre of FIG. 13, a nut 117 is arranged between the element 119 and the surface of the post 110. In these variants, the nut 117 is not in fixed contact with the surface of the post 110 so as to not eliminate the translational freedom of the upper attachment means 120. The nut 117 comprised in the upper attachment means 120 prevents the element 119 from rubbing on the surface of the post 110.

Figure 14:
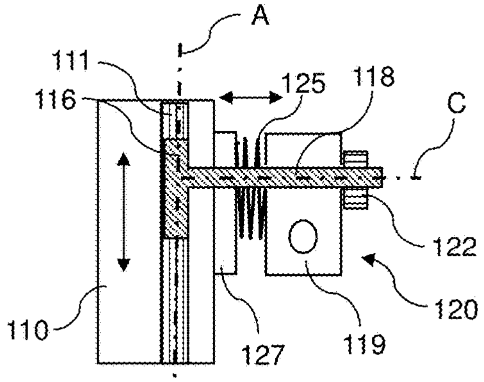
FIG. 14, represents, schematically, in a side view and in cross-section, one of the three variants of the upper attachment means represented in FIG. 13.

In other variants, such as the one shown on the right of FIG. 13 and in FIG. 14, the upper attachment means 120 comprises a spring 125 and a part 127. The part 127 is arranged between the spring 125 and the surface of the post 110 facing the upper attachment means 120. The spring 125 is arranged between the part 127 and an element 119. The spring is therefore in contact with two surfaces.

Note that the spring 125, shown in FIG. 14 and on the right of FIG. 13, is configured to push the two surfaces in opposite directions. Such a double repulsion is indicated by a horizontal straight double-headed arrow in FIG. 14. In particular, the spring 125 pushes the part in contact with the post 110 against the post 110, without limiting the sliding link. In other words, when the upper attachment means 120 follows a translational movement along the axis A of the post, a surface of the element 127 slides over a surface of the post 110. In addition, the spring 125 also pushes elements, such as the nut 122 shown in FIG. 14, in contact with the element 119 against the element 119. Therefore, the vibrations linked to a spacing, also called "play", between different elements are limited.

In some embodiments (not shown), the upper attachment means 120 is free to rotate on an axis C perpendicular to the axis A of the post 110 and parallel to the principal surface of the module 105. In these embodiments, the lower attachment means 115 is free to move in translation along the axis A of the post 110. Preferably, the lower attachment means 115 is also free to rotate on an axis B.

Note that the characteristics mentioned for the lower attachment means 115, in the description above and below, are also applicable to the upper attachment means 120 and vice versa.

In some variants (not shown), the lower and upper attachment means, 115 and 120, are elastically deformable and configured to hold a flat principal surface of the photovoltaic module 105 without deformation when the system is subjected to dynamic stresses.

It is noted that, when the photovoltaic system 100 is installed on a site 102 exposed to strong winds, such a photovoltaic system is deformed elastically. In particular, the post 110 of the system 100 is deformed elastically and in a non-linear deformation, as shown on the right of FIGS. 5 and 6.

Figure 5:
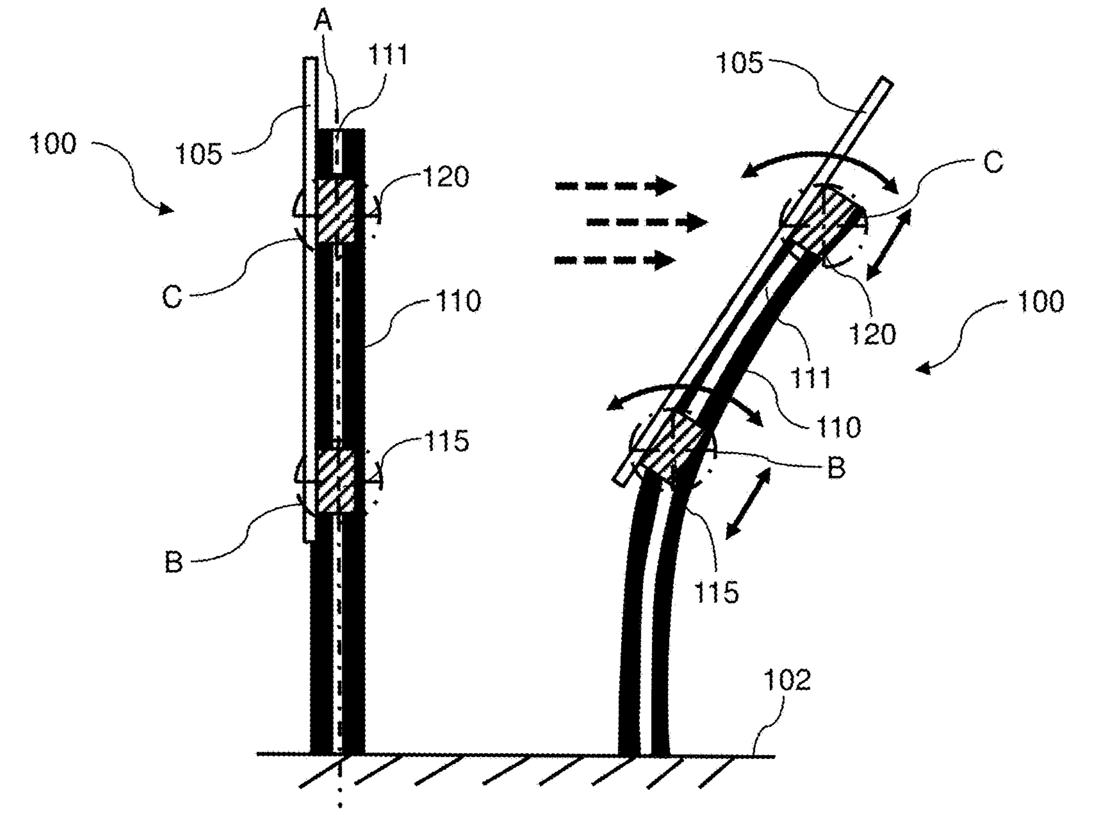
FIG. 5 represents, schematically, in a side view, a static view on the left and a dynamic view on the right of a particular embodiment of the photovoltaic system that is the subject of the present invention.
Figure 6:
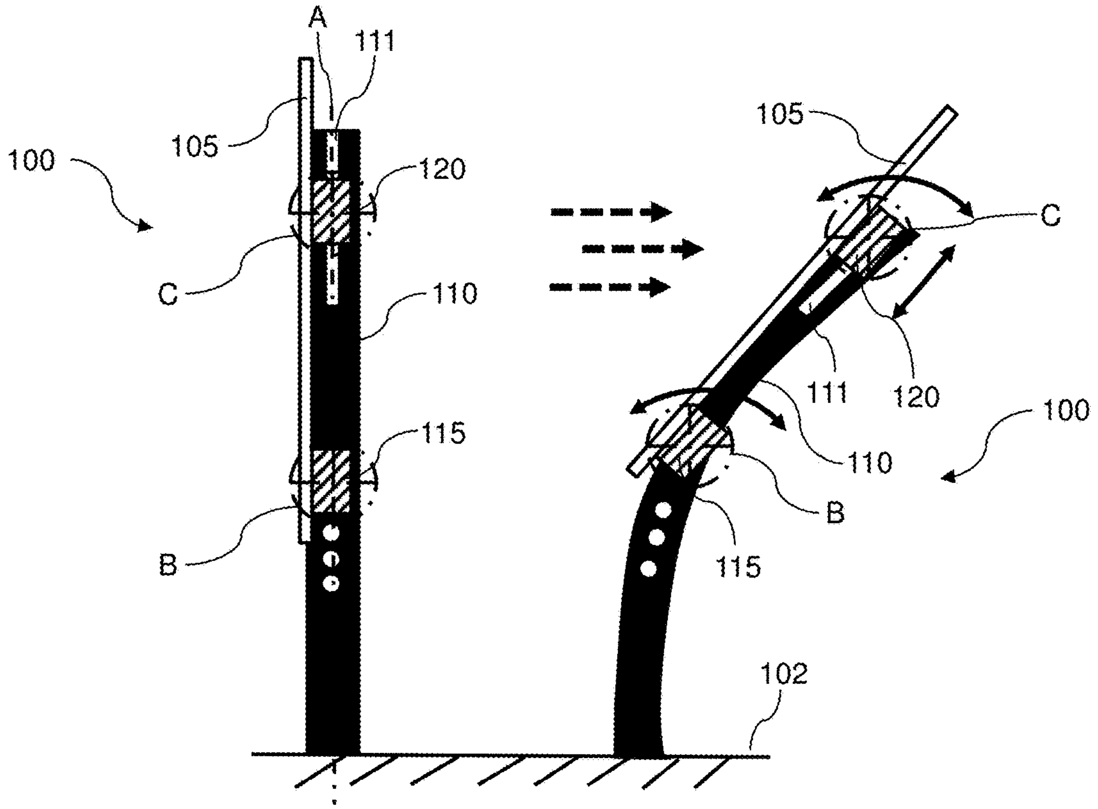
FIG. 6 represents, schematically, in a side view, a static view on the left and a dynamic view on the right of a particular embodiment of the photovoltaic system that is the subject of the present invention.

A non-deformed post 110 of a system 100 is shown on the left of FIGS. 5 and 6, and an elastically deformed post 110 on the right of FIGS. 5 and 6. The deformation of the post 110 is achieved in particular by a force exerted on the principal surface of the module 105. Such a force is, for example, applied by the wind on an outdoors installation site 102. In FIGS. 5 and 6, the wind is indicated by three horizontal dashed arrows. In these conditions, dynamic mechanical stresses are applied to the system 100.

In some embodiments, such as the one shown in FIG. 5, the lower attachment means 115 is free to rotate on an axis B perpendicular to the axis A of the post 110 and parallel to the principal surface of the module 105. In these embodiments, the upper attachment means 120 is free to move in translation along the axis A of the post 110. Preferably, the upper attachment means 120 is also free to rotate on an axis C. It can be seen that the post 110 shown in FIG. 5 comprises a slot 111. In some variants, such as the one shown in FIG. 6, the post 110 comprises an upper slot 111 and a lower hole (not shown).

For example, when the post 110 is subjected to dynamic mechanical stresses, as shown on the right of FIGS. 5 and 6, the lower attachment means 115 makes a rotational movement on the axis B. The rotation of the lower attachment means 115 on the axis B is indicated, in FIGS. 5 and 6, by a lower semicircular double-headed arrow. In addition, the upper attachment means 120 makes a rotational movement on the axis C and a translational movement on the axis A. The rotational movement of the upper attachment means 120 on the axis C is indicated, in FIGS. 5 and 6, by an upper semicircular double-headed arrow. The translational movement of the upper attachment means 120 on the axis A is indicated, in FIGS. 5 and 6, by a vertical straight double-headed arrow. Note that the axis A, when the post 110 is deformed, corresponds to a tangent to the arc of deformation formed by the slot 111. Thus, through the performance and cooperation of these three movements, two rotational and one translational, the surface of the post 105 remains flat.

Figure 16:
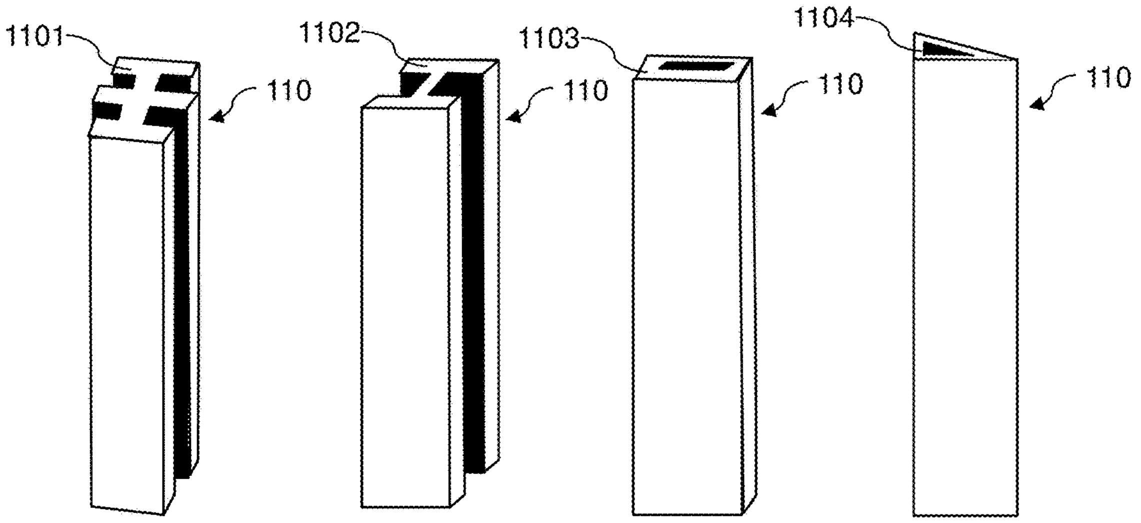
FIG. 16 represents, schematically and in perspective, four particular embodiments of a post.
Figure 17:
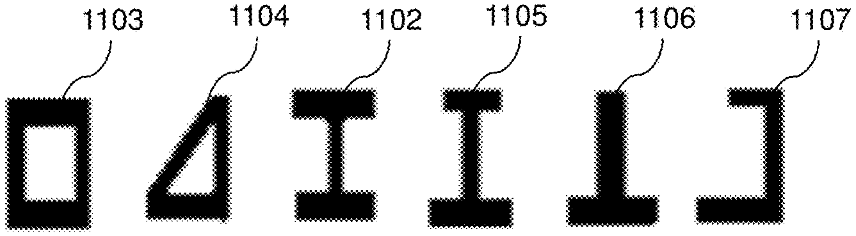
FIG. 17 represents, schematically, in a top view and in cross-section, six particular embodiments of a post.
Figure 18:
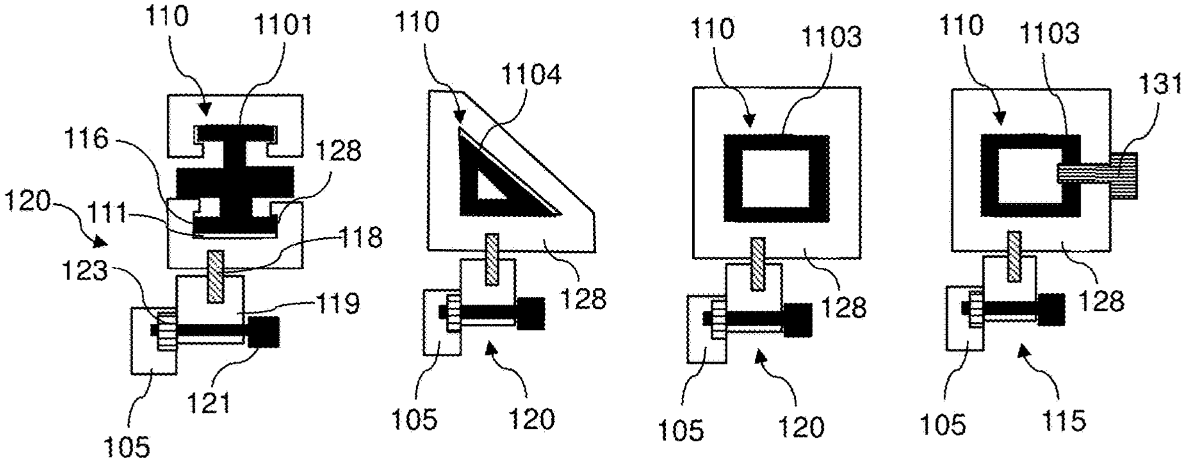
FIG. 18 represents, schematically, in a top view and in cross-section, four particular embodiments of a post, an upper attachment means, an intermediate attachment means, and an intermediate rotational means.

In some embodiments, at least one post 110 has a cross-sectional profile, 1101, 1102, 1103, 1104, 1105, 1106 or 1107, with the following shape:

- triangle 1104, as shown in FIGS. 16 to 18;
- rectangle 1103, as shown in FIGS. 16 to 18;
- symmetrical H 1102, as shown in FIGS. 16 and 17;
- asymmetrical H 1105, as shown in FIG. 17;
- inclined H (not shown);
- cross 1101, as shown in FIGS. 16 to 18;
- C 1107, as shown in FIG. 17;
- F (not shown);
- T 1106, as shown in FIG. 17;
- inclined T (not shown);
- offset inclined T (not shown); or
- inclined Z (not shown).

Note that the choice of the cross-sectional profile of the post 110, from amongst the cross-sectional profiles mentioned above, is made based, for example, on:

- the mechanical resistance;
- the installation constraints;
- minimising production and installation costs; and/or
- a reduced vertical shadow behind the module 105 when the module 105 is bifacial.

In this way, the system's ease of installation and mechanical resistance are improved. In addition, the system 100 has a reduced vertical shadow on the back face of the module 105. When the module 105 is bifacial, the electricity production is therefore increased. In addition, when the post 110 has one of the various cross-sectional profiles mentioned above and is at least partially made of a reflective material, an optimum reflection of the sunlight on the photovoltaic module 105 is achieved. This boosts the increased electricity production. Lastly, when the post 110 has one of these various cross-sectional profiles, the compatibility is improved between the post 110, the upper and lower attachment means, 115 and 120, and the module 105. The attachment means, 115 and 120, are therefore easier to use.

Figure 2:
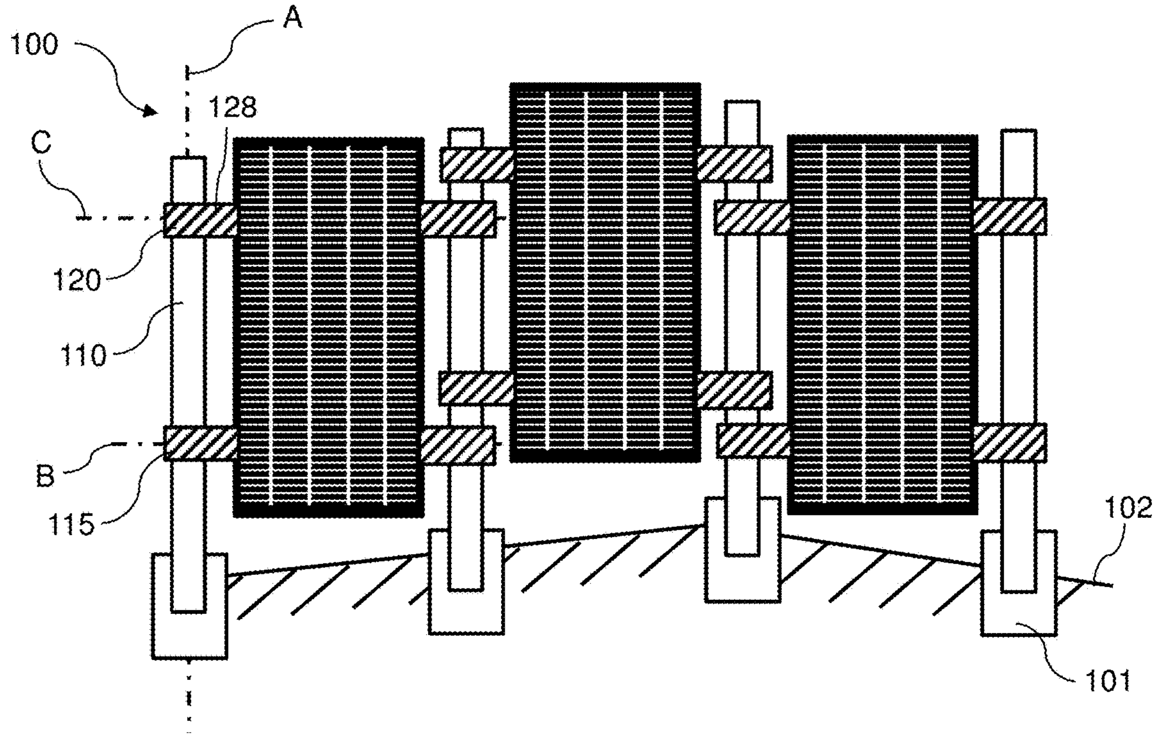
FIG. 2 represents, schematically, in a front view, a variant of the first particular embodiment of the photovoltaic system represented in FIG. 1.

In some embodiments, such as the one shown in FIG. 2, the upper and lower attachment means, 115 and 120, comprise an intermediate assembly means 128. For example, the intermediate assembly means 128 is also called a "ring".

In these embodiments, the intermediate assembly means 128 comprises a slide channel and the post 110 is a slide. In particular, during the preliminary rigid attachment of the photovoltaic module 105 to the post 110, the post 110 and the intermediate assembly means 128 form a sliding link. In other words, the slide channel of the intermediate assembly means 128 and the slide formed by the post 110 form a sliding link.

In these embodiments, the module 105 is preliminarily attached to the post 110 by means of the lower attachment means 115 by a translational movement of the assembly means 128. Such a movement is made on the axis A of the post 110. Note that the assembly means 128 comprises a slide channel 111 and a part 116 of the post 110 forms a slide. When the module 105 is preliminarily attached and positioned at a predefined height, the assembly means 128 is held in place on the post 110. In these embodiments, a surface of the assembly means 128 is in fixed contact with a surface of the post 110. Such a fixed contact corresponds to a complete rigid attachment of the lower portion of the module 105 to the post 110. In other words, the fixed contact eliminates the translational freedom of the lower attachment means 115 by securing the assembly means 128 at a predefined height of the post 110. For example, the assembly means 128 is held by:

- a bolt 131 passing through the assembly means 128 and the post 110, comprising respectively a hole, as shown on the right of FIG. 18; or
- a bolt 131 passing through only the assembly means 128 comprising a hole, the extremity of the screw of the bolt 131 in contact with the post 110 therefore compresses the post 110. Therefore, the holding of the assembly means 128 is independent of the position of any holes of the post 110.

In these embodiments, the upper attachment means 120 is free to move in translation and comprises an intermediate assembly means 128. In particular, three non-limiting variants of such an intermediate assembly means 128 of the upper attachment means 120 are shown in FIG. 18. The intermediate assembly means 128 is configured to form a slide channel 111 around at least one part 116 of the post 110. Note that the part 116 of the post forms a slide. In other words, the slide channel 111 of the intermediate assembly means 128 and the slide 116 of the post 110 form a sliding link. In some embodiments, such as those shown in FIGS. 2 and 18, the upper attachment means 120 is also free to rotate. In particular, the upper attachment means 120 comprises the intermediate assembly means 128 and an intermediate rotational means 119. The intermediate assembly means 128 comprises a hole and the intermediate rotational means 119 comprises a shaft 118. Note that the hole of the intermediate assembly means 128 and the shaft 118 form a pivot link. In other words, the intermediate rotational means 119 forms a pivot link with the intermediate assembly means 128. In some variants, the intermediate rotational means 119 forms a sliding pivot link with the intermediate assembly means 128.

Figure 3:
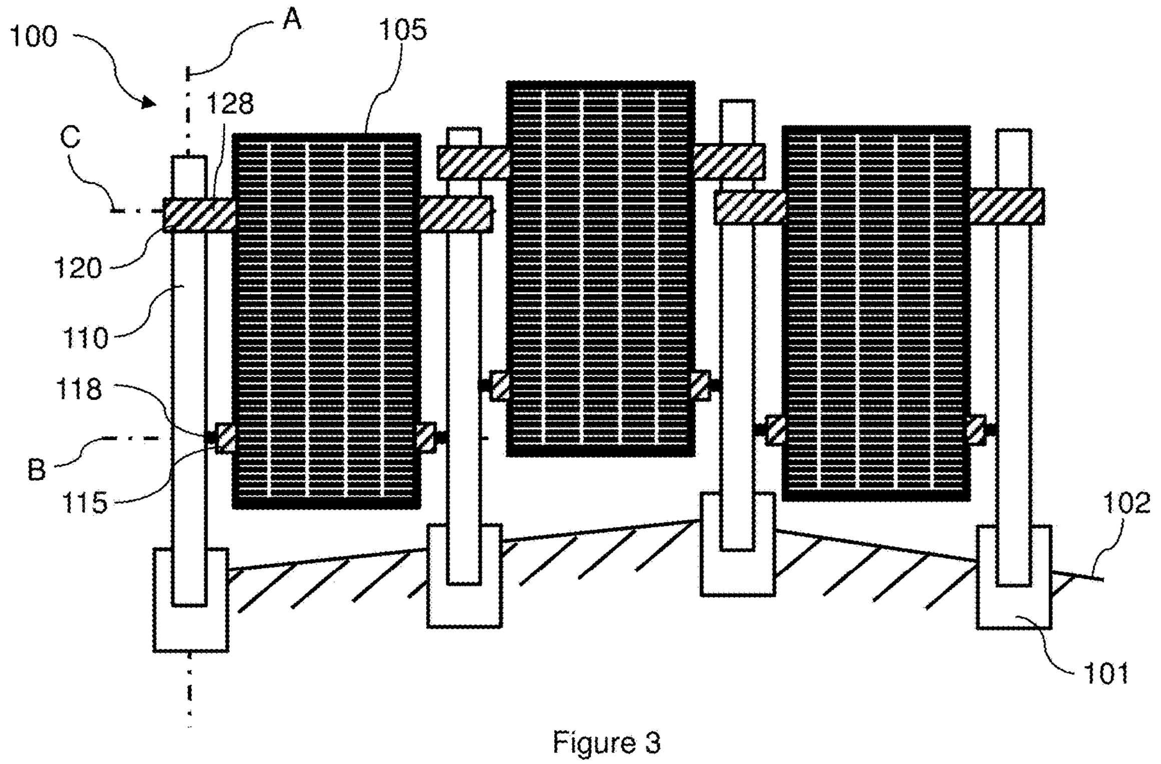
FIG. 3 represents, schematically, in a front view, a variant of the first particular embodiment of the photovoltaic system represented in FIG. 1.

In some variants, such as those shown in FIG. 3, the photovoltaic system 100 comprises:

a lower attachment means 115 that is free to rotate; and an upper attachment means 120 that is free to move in translation and in rotation, comprising an intermediate assembly means 128. The three examples of such an intermediate assembly means 128, shown in FIG. 18, are also applicable to these variants. Note that the attachment means 120 also comprises an intermediate rotational means 119.

In some embodiments, when the installation site has a flat surface, the same intermediate securing means 128 of an attachment means, 115 and/or 120, is used for securing two photovoltaic modules 105 to the post 110. In other words, each photovoltaic module 105 is secured to a surface of the post 110, the two attachment surfaces being different.

In some embodiments, the lower attachment means 115 and upper attachment means 120 have variable dimensions. These dimensions are determined as a function of the desired distance between the post 110 and the module 105. Note that the increase in such a spacing distance reduces the shadow cast by the post 110 on the module 105, especially on the back face. Such a spacing is, for example, utilised when a frameless bifacial photovoltaic module 105 is used in the system 100. Thus, reducing the shadows cast on the principal surface of the photovoltaic module 105 boosts the increased electricity production.

In some embodiments, the principal surface, or front face, of the photovoltaic module 105 of the system 100 is aligned to the front surface delimited by a post 110. In other words, the principal surface of the photovoltaic module 105 is not set back with respect to the front surface delimited by a post 110. Preferably, the position of the lower and upper attachment means minimise the shadows on the front face.

In these embodiments, the exposure of the front face of the photovoltaic module 105 to the light rays is increased since the shadows are reduced. Note that, when the photovoltaic module 105 is bifacial, this preferred exposure of the front face results in larger shadows cast on the back face. However, the efficiency of the conversion of solar energy into electrical energy is higher for the front face of the module 105 compared to the back face of the module 105. Therefore, despite the presence of shadows on the back face of the module 105, the increased electricity production is boosted by this preferred exposure to light rays of the front face of the module 105.

Note that, when the front face of the module is preferably exposed to the light rays, such a solution is less demanding with respect to bifaciality. In other words, the positioning of the photovoltaic module 105 is not dependent on the bifaciality. Therefore, a wider choice of photovoltaic modules 105 is available, including in particular photovoltaic modules 105 with a smaller economic cost.

When several photovoltaic systems 100 with rows of modules 105 are used, the front faces of the modules 105 can be oriented according to a performance choice for the system. For example, the front faces of the modules 105 are oriented due East through to an orientation due West. Therefore there is a significant degree of freedom in the orientations of the rows of modules 105. Thus a range of electrical profiles is available according to the orientation of the photovoltaic systems and according to the choice of the surface of the posts 110 to be aligned to the front face of the module 105. In particular, such a flexibility of orientation is utilised, for example, to:

adjust the system 100 to the spatial constraints inherent in the installation site; and/or position the system 100 so as to reduce exposure to strong prevailing winds.

In some variants, when the installation site is agricultural land, the flexibility of orientation is utilised for installing, for example, rows in a straight line from South to North. This installation is preferably carried out so that the ground receives a uniform amount of light.

In some embodiments, such as those shown in FIGS. 1 to 6, the photovoltaic module 105 of the photovoltaic system, 100, 200, 300 or 400, is rectangular. In particular, the photovoltaic module 105 is oriented such that a short side of the module 105 is arranged facing a surface 102 on which the photovoltaic system is installed. In other words, the module 105 is oriented in "portrait" mode as opposed to "landscape" mode. Note that the surface 102 is delimited by the installation ground of the photovoltaic system, 100, 200, 300 or 400.

Figure 4:
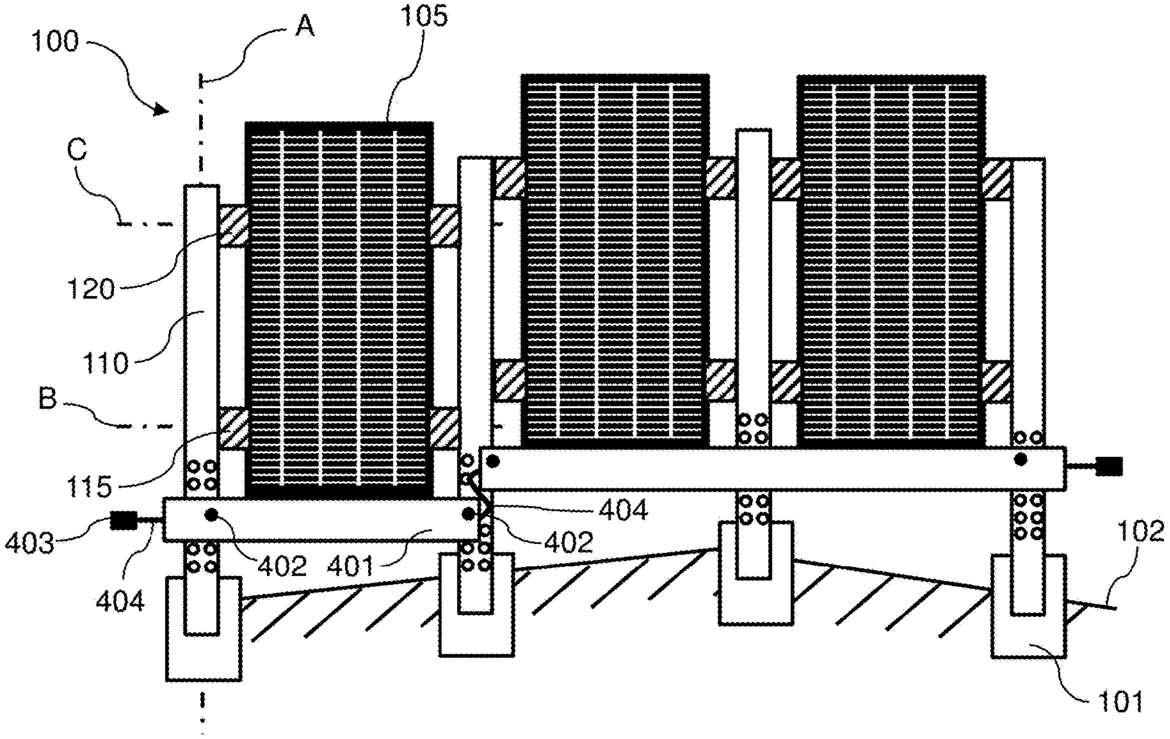
FIG. 4 represents, schematically, in a front view, a variant of the first particular embodiment of the photovoltaic system represented in FIG. 1.

In some embodiments, such as the one shown in FIG. 4, the system 100 also comprises:

at least one cross-member 401; and at least two fastenings 402 of the cross-member.

In these embodiments, the cross-member 401 is arranged under the module 105. In this configuration, the photovoltaic system 400 is installed on a surface 102 and the module is positioned opposite a surface 102. The cross-member 401 has extremities, and each fastening 402 is configured to secure an individual extremity of the cross-member 401 to a post 110. It is noted that, in FIG. 4, the cross-member 401 is arranged and secured between at least two posts.

In these embodiments, when the photovoltaic module 105 is rectangular and has two short sides and two long sides, the short side of the photovoltaic module 105 therefore rests along the cross-member 401.

In this way, the risks of the photovoltaic module 105 slipping, in a downward vertical movement, are limited, especially during the installation of the system 100.

Several embodiments are possible for the shape of the cross-sectional profile of the cross-member 401 of the system 400 shown in FIG. 4. These different embodiments are shown in FIGS. 19 and 20.

Figure 19:
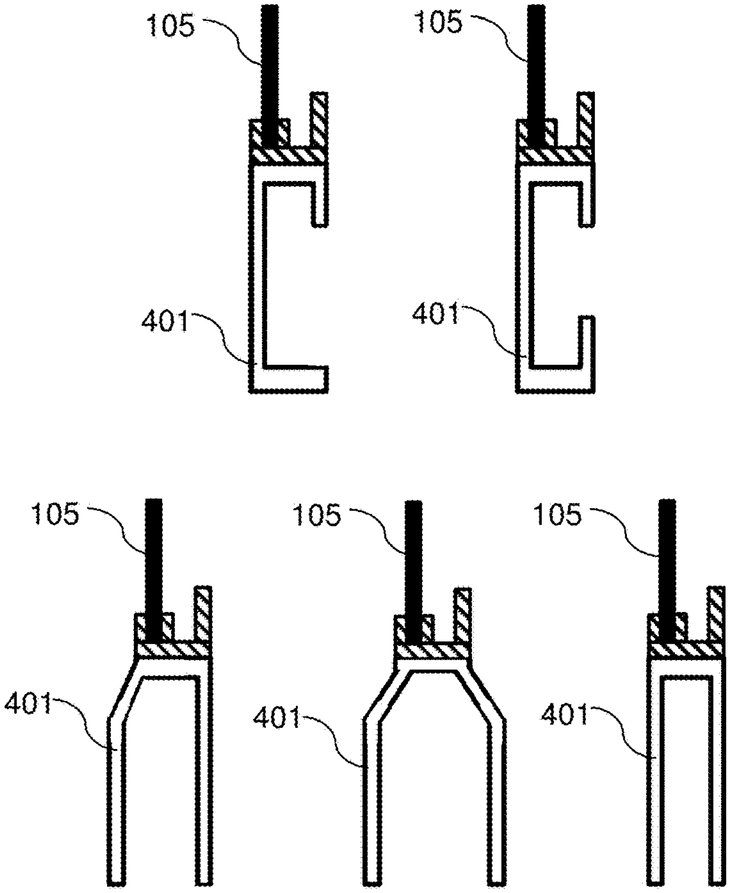
FIG. 19 represents, schematically, in a side view and in cross-section, five particular embodiments of a cross-member.

In some embodiments, the cross-member 401 of the system 400 has a cross-sectional profile with the following shape:

C, as shown by the two shapes at the top of FIG. 19; or inverted U, as shown by the three shapes in the bottom of FIG. 19.

Figure 20:
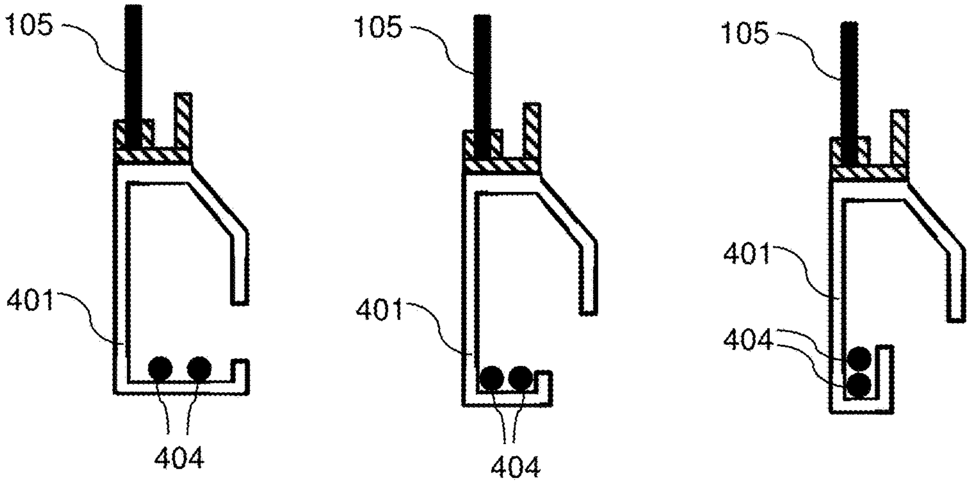
FIG. 20 represents, schematically, in a side view and in cross-section, three particular embodiments of a cross-member.

In some embodiments, such as those shown in FIG. 20, the cross-member 401 also comprises an upper rim in contact with the photovoltaic module 105 and a lower rim configured to hold electrical cables 404 connected to the photovoltaic module 105. Preferably, the lower rim is a track. It is noted that the lower rim is defined by a width and a height.

In this way, the electrical cables 404 are protected and oriented according to predefined constraints on use of the photovoltaic system 100.

In some embodiments, such as those shown in FIG. 20, the width of the lower edge of the cross-member 401 shown on the left of FIG. 20 is greater that the widths of the lower edges of the cross-members 401 shown respectively in the centre and on the right of FIG. 20. It can also be seen that the height of the lower edge of the cross-member 401 shown on the right of FIG. 20 is greater that the heights of the lower edges of the cross-members 401 shown respectively in the centre and on the left of FIG. 20.

Preferably, when modules 105 are serially connected, the positive cable of the photovoltaic modules 105 has a different length, shorter or longer, than the length of the negative cable of the photovoltaic modules 105. Thus, the connectors 403 between the modules 105 are protected by the cross-member 401. The modules 105 are serially connected in a chain, referred to as a "string", known to the person skilled in the art. In other words, the positive cable of a first module 105 is connected to a negative cable of a second module 105 by means of a connector 403. In this configuration, if the positive cable of the first module 105 has a length equal to the length of the negative cable of the second module 105 then the connector 403 of these two cables 404 arrives at the location of the post 110. Such an arrangement of the connector 403 is to be avoided in certain cases, in particular when the cables are positioned in the bottom of the modules 105, i.e. at the location of the short side arranged facing the ground 102. In this case, the connector 403 is not protected by the cross-member 401. Therefore, a difference in the length of the positive cable and the negative cable makes it possible to avoid such an arrangement of the connector 403 and thus enables the connector 403 to be protected by the cross-member 401.

In some embodiments, not shown, the cross-member 401 comprises at least one hole, or a perforated shape, on the upper rim or on a back rim. It is noted that the back rim of the cross-member 401 is on the same side as the junction box of the photovoltaic module 105. The hole of the cross-member 401 is configured to facilitate the passage of the electric cables 404 of the photovoltaic module 105.

In some embodiments (not shown), a cross-member 401 comprised in the system 100 is configured to at least partially enclose at least one post 110.

In this way, the system has a more compact overall structure, thus making it possible to strengthen the stability of the structure.

For example, the cross-member 401 has slots, longitudinal along an axis parallel to the axes B and C and/or transversal along an axis perpendicular to the axes B and C. Note that such slots are configured to partially or completely enclose a post 110.

In some embodiments (not shown), a fastening of the cross-member 401 comprises at least one intermediate fastening configured to complete the enclosure around at least one post 110. This therefore strengthens the securing of the cross-member to the posts.

In some variants (not shown), a fastening of the cross-member 401 comprises at least one L-shaped intermediate fastening comprising:

- an upper part configured to be secured to a post; and
- a lower part, perpendicular to the upper part and to the post, and configured to support the cross-member.

This strengthens the support of the module 101, making it possible to limit the mechanical stresses due to gravity.

In particular, when the system 100, comprises two posts and two brackets are rigidly attached respectively to a post 110, the brackets are supports of the extremities of a cross-member 401. Note that the rigid attachment of a bracket to a post 110 is achieved by any means known to the person skilled in the art. For example, the rigid attachment is achieved by a bolt configured to attach the post 110 with the upper part of the bracket.

Figure 21:
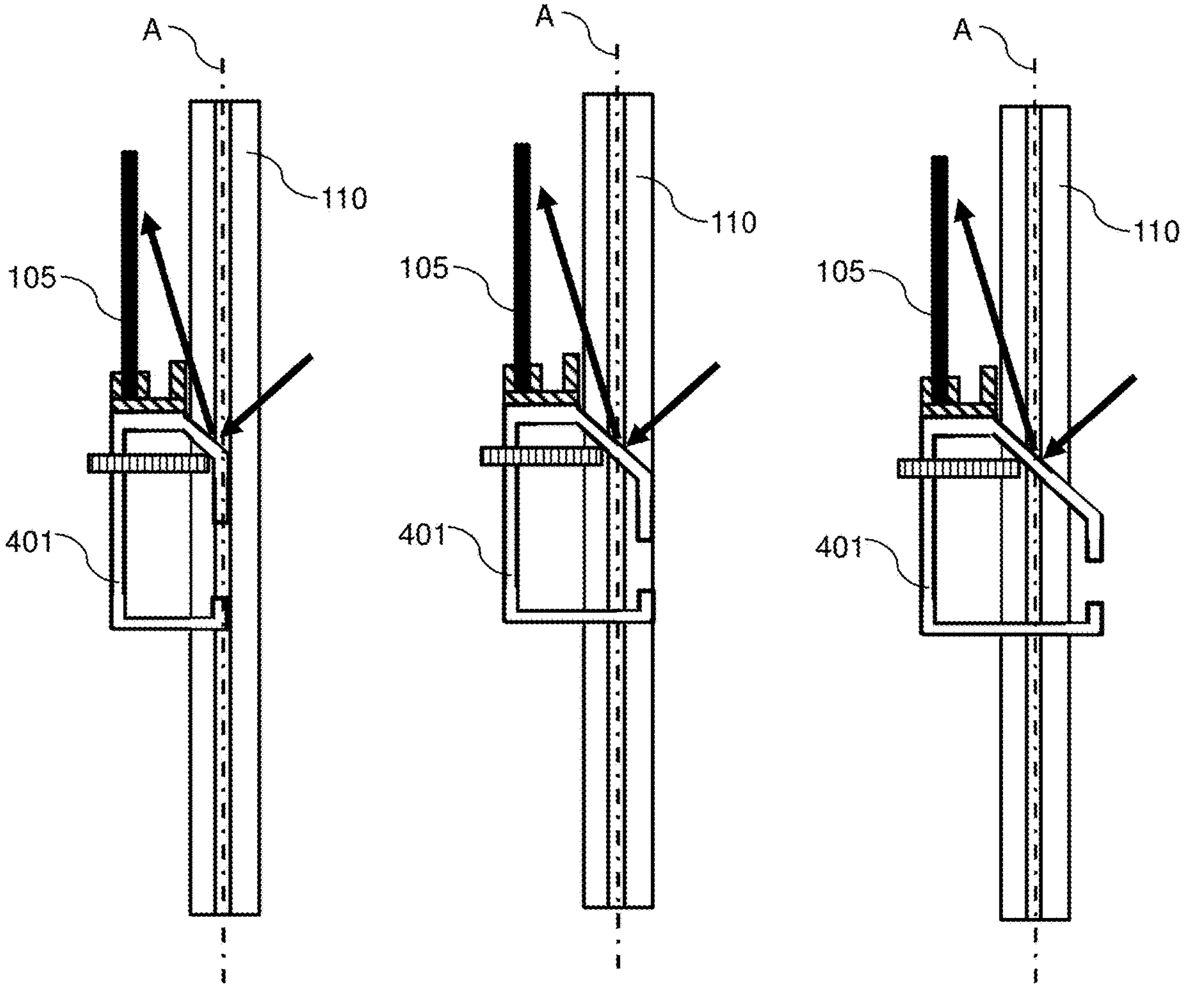
FIG. 21 represents, schematically, in a side view and in cross-section, three particular embodiments of a cross-member.

In some embodiments, such as those shown in FIG. 21, the cross-member 401 is at least partially made of a light-reflecting material and has a C-shaped cross-sectional profile. In FIG. 21, the light rays are shown by straight arrows. For example, FIG. 21 shows indirect light radiation on the photovoltaic module 105. The indirect light radiation is the result of the reflection of one or more light rays applied directly on a back surface of the reflective cross-member 401.

In some embodiments, such as those shown in FIGS. 1 to 6, the photovoltaic system 100 comprises no horizontal element connecting two posts 110, for example a girder, cross-member, brace or strut, arranged above a portion of the module 105 not facing an installation ground. In other words, no horizontal element connecting two parallel posts 110 is arranged above a portion of the module 105 farthest from the ground. For example when the module is rectangular, the system 100 does not comprise any horizontal element connecting two posts arranged above the short side of the module 105 that does not face an installation ground. In other words, no horizontal element connecting two parallel posts 110 is arranged above the short side of the module 105 farthest from the ground.

Figure 22:
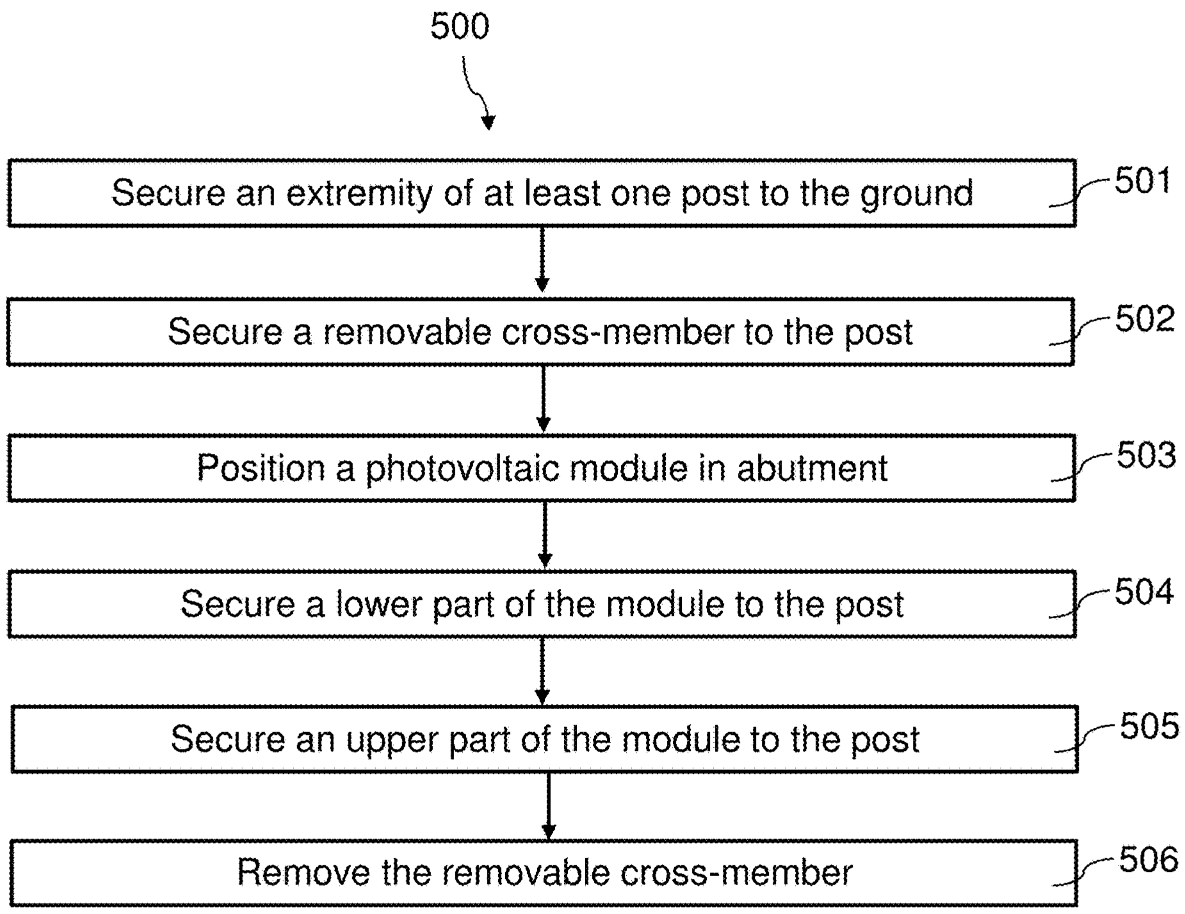
FIG. 22 represents, schematically and in the form of a logic diagram, a particular series of steps of the method that is the subject of the present invention.

FIG. 22 shows a schematic view of an optional embodiment of the method 500 that is the subject of the present invention. The method 500 for installing a deformable vertical photovoltaic system comprises:

- a step 501 of securing an extremity of at least one post to the ground;
- a step 502 of securing a removable cross-member to said post;
- a step 503 of positioning at least one photovoltaic module resting on the cross-member;
- a step 504 of securing a lower part of the module to the post by a lower attachment means;
- a step 505 of securing an upper part of the module to the post by an upper attachment means; and
- a step 506 of removing the removable cross-member.

In particular, each post has an axis, and each photovoltaic module has a front face, referred to as the "principal surface" of the module, parallel to the plane formed by the active parts of the photovoltaic cells. Note that the plane is limited by the outer edges of the frames, or by the front and back layers protecting the modules when the module has no frame. The front and back layers can be made of glass in the case of double-glass modules, it is noted that other materials can also be used.

Note that each attachment means is deformable and/or at least free to move in translation along the axis of the post and/or at least free to rotate on the axis perpendicular to the axis of the post and parallel to the surface of the module. In addition, at least one attachment means from amongst the lower attachment means and the upper attachment means is deformable and/or at least free to move in translation along the axis of the post, and the other means is deformable and/or at least free to rotate on an axis perpendicular to the axis of the post.

During the step 501 of securing an extremity of the post to the installation ground, the post is positioned first so as to differentiate between:

- an extremity subsequently secured to the ground; and
- an upper portion of the post subsequently secured to a photovoltaic module.

In particular, during the step 501 of securing the post, the post is secured to the ground using any attachment means known to the person skilled in the art.

During the step 502 of securing a removable cross-member, such a cross-member is secured reversibly to the post.

During the positioning step 503, the module is arranged so as to rest on the cross-member. In this way, the cross-member maintains the position of the module during the securing steps, 504 and 505.

During the securing steps, 504 and 505, the module is secured to the post by the upper and lower attachment means. The choice of the nature of the intermediate attachment means is dependent on the rotational and/or translational freedoms needed for these means. In some embodiments, the lower attachment means is free to rotate, and the upper attachment means is at least free to move in translation. Preferably, the upper attachment means is also free to rotate.

In some variants, a part of one or more attachment means is present on the post. In other words, the post is machined so as to comprise a part of one or more attachment means. In other variants, this part is secured to the post during the installation of the system on the installation site. For example, the part of the attachment means is positioned approximatively and held in the portion of the final assembly post by, in particular, a lower stop and an upper stop.

In some variants (not shown), the method for installing a deformable vertical photovoltaic system comprises several steps that may possibly be repeated:

- a step of securing an extremity of at least two posts to the ground;
- a step of securing a removable cross-member to said posts;
- a step 503 of positioning at least one photovoltaic module resting on the cross-member;
- a step of securing a lower part of the module to said posts by a lower attachment means;
- a step of securing an upper part of the module to said posts by an upper attachment means; and
- a step of removing the removable cross-member.

Preferably, the means of the device 100 are configured to implement the steps of the method 500 and their embodiments as described above, and the method 500 and its different embodiments can be implemented by the means of the device 100.

The invention claimed is:

1. A deformable vertical photovoltaic system comprising at least:

- a vertical photovoltaic module having a front face, referred to as the "principal surface" of the vertical photovoltaic module, parallel to the plane formed by the active parts of the photovoltaic cells; and a vertical post having an axis
- wherein the deformable vertical photovoltaic system comprises at least:
- a first attachment means, referred to as the "lower attachment means", for attaching a lower portion of the vertical photovoltaic module to the vertical post; and
- a second attachment means, referred to as the "upper attachment means", for attaching an upper portion of the vertical photovoltaic module to the vertical post,
- each means being deformable and/or at least free to move in translation along the axis of the vertical post and/or at least free to rotate on an axis perpendicular to the axis of the vertical post and parallel to the principal surface of the vertical photovoltaic module,
- at least one attachment means from amongst the lower attachment means and the upper attachment means being deformable and/or at least free to move in translation along the axis of the vertical post, and the other attachment means being deformable and/or at least free to rotate on the axis perpendicular to the axis of the vertical post and parallel to the principal surface of the vertical photovoltaic module.

2. The deformable vertical photovoltaic system according to claim 1, wherein each means is at least free to move in translation along the axis of the vertical post and/or at least free to rotate on the axis perpendicular to the axis of the vertical post and parallel to the principal surface of the vertical photovoltaic module, at least one attachment means from amongst the lower attachment means and the upper attachment means being at least free to move in translation along the axis of the vertical post and the other attachment means being at least free to rotate on the axis perpendicular to the axis of the vertical post and parallel to the principal surface of the vertical photovoltaic module.

3. The deformable vertical photovoltaic system according claim 1, wherein one of the attachment means from amongst the lower attachment means and the upper attachment means is at least free to rotate on the axis perpendicular to the axis of the vertical post and the other attachment means is at least free to move in translation along the axis of the vertical post and at least free to rotate on the axis perpendicular to the axis of the vertical post and parallel to the principal surface of the vertical photovoltaic module.

4. The deformable vertical photovoltaic system according to claim 1, wherein said other attachment means includes a hole, and the vertical post includes a shaft, the hole and the shaft forming a pivot link or a sliding pivot.

5. The deformable vertical photovoltaic system according to claim 1, wherein said at least one attachment means includes a slide channel and the vertical post includes a slide, the slide channel and the slide forming a sliding link or a sliding pivot.

6. The deformable vertical photovoltaic system according to claim 5, wherein said at least one attachment means comprises an intermediate assembly means, this intermediate assembly means being configured to form a slide channel around at least one part of the vertical post.

7. The deformable vertical photovoltaic system according to claim 6, wherein said at least one attachment means comprising an intermediate assembly means is free to rotate, and also comprises an intermediate rotational means forming a pivot link or sliding pivot with the intermediate assembly means.

8. The deformable vertical photovoltaic system according to claim 1, wherein the vertical photovoltaic module is rectangular, the vertical photovoltaic module being oriented such that a short side of the vertical photovoltaic module is arranged facing a surface on which the photovoltaic system is installed.

9. The deformable vertical photovoltaic system according to claim 1, which also comprises:

- at least one cross member arranged under the vertical photovoltaic module positioned facing a surface on which the photovoltaic system is installed, and having extremities; and
- at least two fastenings, each such fastening being configured to secure an individual extremity of at least one such cross-member to the vertical post, this cross-member being arranged and secured between at least two posts.

10. A method for installing a deformable vertical photovoltaic system, comprising:

- a step of securing an extremity of at least one vertical post to the ground, said at least one vertical post having an axis;
- a step of securing a removable cross-member to said at least one vertical post;
- a step of positioning a vertical photovoltaic module resting on the cross-member, the vertical photovoltaic module having a front face, referred to as the "principal surface" of the vertical photovoltaic module, parallel to the plane formed by the active parts of the photovoltaic cells;

a step of securing a lower part of said vertical photovoltaic module to said at least one vertical post by a lower attachment means that is deformable and/or at least free to move in translation along the axis of the at least one vertical post and/or at least free to rotate on an axis perpendicular to the axis of the at least one vertical post and parallel to the principal surface of the vertical photovoltaic module;

a step of securing an upper part of the vertical photovoltaic module to said at least one vertical post by an upper attachment means that is deformable and/or at least free to move in translation along the axis of the at least one vertical post and/or at least free to rotate on an axis perpendicular to the axis of the at least one vertical post and parallel to the principal surface of the vertical photovoltaic module, at least one attachment means from amongst the lower attachment means and the upper attachment means being deformable and/or at least free to move in translation along the axis of the at least one vertical post, and the other means being deformable and/or at least free to rotate on an axis perpendicular to the axis of the at least one vertical post; and a step of removing the removable cross-member.

11. The deformable vertical photovoltaic system according to claim 1, wherein said other attachment means include a shaft, and the vertical post includes a hole, the hole and the shaft forming a pivot link or a sliding pivot.

12. The deformable vertical photovoltaic system according to claim 1, wherein said at least one attachment means include a slide and the vertical post includes a slide channel, the slide channel and the slide forming a sliding link or a sliding pivot.

* * * * *